United States Patent
Yoo et al.

(10) Patent No.: US 9,350,475 B2
(45) Date of Patent: May 24, 2016

(54) PHYSICAL LAYER SIGNALING TO USER EQUIPMENT IN A WIRELESS COMMUNICATION SYSTEM

(75) Inventors: Taesang Yoo, San Diego, CA (US); Tao Luo, San Diego, CA (US); Tingfang Ji, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 663 days.

(21) Appl. No.: 13/190,308

(22) Filed: Jul. 25, 2011

(65) Prior Publication Data

US 2012/0190391 A1 Jul. 26, 2012

Related U.S. Application Data

(60) Provisional application No. 61/367,865, filed on Jul. 26, 2010.

(51) Int. Cl.
| | |
|---|---|
| *H04W 72/00* | (2009.01) |
| *H04J 11/00* | (2006.01) |
| *H04B 15/00* | (2006.01) |
| *H04L 25/03* | (2006.01) |

(52) U.S. Cl.
CPC .............. *H04J 11/005* (2013.01); *H04B 15/00* (2013.01); *H04L 25/03891* (2013.01)

(58) Field of Classification Search
CPC ....................... H04W 72/1278; H04W 72/1289
USPC ................................................ 455/63.1, 63.2
See application file for complete search history.

(56) References Cited

U.S. PATENT DOCUMENTS

| | | | |
|---|---|---|---|
| 5,936,979 A | 8/1999 | Jyrkkae | |
| 6,574,456 B2 | 6/2003 | Hamabe | |
| 6,839,333 B1 | 1/2005 | Åkerberg | |
| 6,907,270 B1 | 6/2005 | Blanz | |
| 6,973,098 B1 | 12/2005 | Lundby et al. | |
| 7,031,753 B2 | 4/2006 | Hashem et al. | |
| 7,283,510 B2 | 10/2007 | Ito et al. | |
| 7,428,269 B2 | 9/2008 | Sampath et al. | |
| 7,471,621 B2 * | 12/2008 | Chen ..................... | H04W 16/10 370/208 |
| 7,738,907 B2 | 6/2010 | Xiao et al. | |
| 7,742,444 B2 | 6/2010 | Mese et al. | |

(Continued)

FOREIGN PATENT DOCUMENTS

| | | |
|---|---|---|
| CN | 1438781 A | 8/2003 |
| CN | 1708923 A | 12/2005 |

(Continued)

OTHER PUBLICATIONS

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; 20100222, Feb. 16, 2010, XP050418504, [retrieved on Feb. 16, 2010].

(Continued)

*Primary Examiner* — Wen Huang
(74) *Attorney, Agent, or Firm* — Seyfarth Shaw LLP

(57) ABSTRACT

A method of wireless communication includes receiving physical layer signaling from a serving eNodeB in a wireless network. Interference estimation, interference cancellation and/or spatial equalization of user equipment is controlled in accordance with the received signaling.

16 Claims, 6 Drawing Sheets

(56) References Cited

U.S. PATENT DOCUMENTS

| | | |
|---|---|---|
| 7,813,311 B2 | 10/2010 | Dick et al. |
| 7,860,198 B2 | 12/2010 | Montalbano |
| 7,907,572 B2 | 3/2011 | Yang et al. |
| 7,944,983 B2 | 5/2011 | Fu et al. |
| 8,068,785 B2 | 11/2011 | Ahn et al. |
| 8,085,875 B2 | 12/2011 | Gore et al. |
| 8,107,885 B2 | 1/2012 | Love et al. |
| 8,121,602 B2 | 2/2012 | Yi et al. |
| 8,130,849 B2 | 3/2012 | Lincoln et al. |
| 8,254,911 B1 * | 8/2012 | Lee .................. 455/425 |
| 8,270,547 B2 | 9/2012 | Panicker et al. |
| 8,275,408 B2 | 9/2012 | Attar et al. |
| 8,305,921 B2 | 11/2012 | Narasimhan et al. |
| 8,385,477 B2 | 2/2013 | Cedergren et al. |
| 8,477,603 B2 | 7/2013 | Sambhwani et al. |
| 8,493,942 B2 | 7/2013 | Luo et al. |
| 8,605,771 B2 | 12/2013 | Cairns |
| 8,611,295 B2 | 12/2013 | Song et al. |
| 8,654,701 B2 | 2/2014 | Kazmi et al. |
| 9,036,484 B2 * | 5/2015 | Sun .................. H04W 24/10 370/241 |
| 2001/0007819 A1 | 7/2001 | Kubota |
| 2002/0188723 A1 | 12/2002 | Choi et al. |
| 2003/0016740 A1 | 1/2003 | Jeske et al. |
| 2003/0125040 A1 | 7/2003 | Walton et al. |
| 2004/0072579 A1 | 4/2004 | Hottinen |
| 2006/0121946 A1 | 6/2006 | Walton et al. |
| 2007/0036179 A1 | 2/2007 | Palanki et al. |
| 2007/0064655 A1 * | 3/2007 | Ruuska .................. 370/332 |
| 2007/0081480 A1 * | 4/2007 | Cai et al. .................. 370/312 |
| 2007/0098098 A1 | 5/2007 | Xiao et al. |
| 2007/0109989 A1 | 5/2007 | Nakagawa et al. |
| 2007/0191015 A1 * | 8/2007 | Hwang et al. .................. 455/442 |
| 2007/0197251 A1 | 8/2007 | Das et al. |
| 2007/0232238 A1 | 10/2007 | Kawasaki |
| 2007/0293234 A1 | 12/2007 | Kim et al. |
| 2008/0014958 A1 | 1/2008 | Kim et al. |
| 2008/0051087 A1 * | 2/2008 | Ryu et al. .................. 455/436 |
| 2008/0108363 A1 * | 5/2008 | Yu .................. H04W 48/12 455/450 |
| 2008/0123547 A1 | 5/2008 | Palanki |
| 2008/0233967 A1 | 9/2008 | Montojo et al. |
| 2008/0261645 A1 | 10/2008 | Luo et al. |
| 2009/0135754 A1 | 5/2009 | Yavuz et al. |
| 2009/0170442 A1 | 7/2009 | Asanuma et al. |
| 2009/0199055 A1 | 8/2009 | Chen et al. |
| 2009/0201825 A1 | 8/2009 | Shen et al. |
| 2009/0238256 A1 | 9/2009 | Onggosanusi et al. |
| 2009/0247181 A1 | 10/2009 | Palanki et al. |
| 2009/0252077 A1 | 10/2009 | Khandekar et al. |
| 2009/0257390 A1 | 10/2009 | Ji et al. |
| 2009/0286497 A1 | 11/2009 | Akkarakaran et al. |
| 2009/0316809 A1 | 12/2009 | Chun et al. |
| 2009/0323616 A1 | 12/2009 | Zeller et al. |
| 2010/0002664 A1 | 1/2010 | Pan et al. |
| 2010/0008282 A1 | 1/2010 | Bhattad et al. |
| 2010/0035555 A1 | 2/2010 | Bala et al. |
| 2010/0039970 A1 | 2/2010 | Papasakellariou et al. |
| 2010/0041390 A1 | 2/2010 | Chen et al. |
| 2010/0048151 A1 | 2/2010 | Hara |
| 2010/0067366 A1 | 3/2010 | Nicoli et al. |
| 2010/0098012 A1 | 4/2010 | Bala et al. |
| 2010/0106828 A1 | 4/2010 | Palanki et al. |
| 2010/0111235 A1 | 5/2010 | Zeng et al. |
| 2010/0182903 A1 | 7/2010 | Palanki et al. |
| 2010/0195582 A1 * | 8/2010 | Koskinen .................. 370/329 |
| 2010/0195604 A1 | 8/2010 | Papasakellariou et al. |
| 2010/0202311 A1 | 8/2010 | Lunttila et al. |
| 2010/0202372 A1 | 8/2010 | Chun et al. |
| 2010/0214937 A1 | 8/2010 | Chen et al. |
| 2010/0215075 A1 | 8/2010 | Jonsson et al. |
| 2010/0216405 A1 | 8/2010 | Bhadra et al. |
| 2010/0222062 A1 | 9/2010 | Chou et al. |
| 2010/0226327 A1 | 9/2010 | Zhang et al. |
| 2010/0227638 A1 | 9/2010 | Park et al. |
| 2010/0255854 A1 * | 10/2010 | Lee .................. H04W 72/082 455/450 |
| 2010/0267408 A1 * | 10/2010 | Lee .................. H04W 52/243 455/509 |
| 2010/0272077 A1 | 10/2010 | Van Rensburg et al. |
| 2010/0278109 A1 | 11/2010 | Papasakellariou et al. |
| 2010/0278290 A1 | 11/2010 | Huang et al. |
| 2011/0013710 A1 | 1/2011 | Xiao |
| 2011/0032839 A1 | 2/2011 | Chen et al. |
| 2011/0081917 A1 * | 4/2011 | Frank et al. .................. 455/456.1 |
| 2011/0092231 A1 | 4/2011 | Yoo et al. |
| 2011/0105164 A1 | 5/2011 | Lim et al. |
| 2011/0105171 A1 | 5/2011 | Luschi et al. |
| 2011/0142003 A1 | 6/2011 | Kuchi et al. |
| 2011/0158211 A1 | 6/2011 | Gaal et al. |
| 2011/0170514 A1 | 7/2011 | Eriksson et al. |
| 2011/0177821 A1 * | 7/2011 | Senarath et al. .................. 455/450 |
| 2011/0206167 A1 | 8/2011 | Rosenqvist et al. |
| 2011/0211503 A1 | 9/2011 | Che et al. |
| 2011/0249643 A1 | 10/2011 | Barbieri et al. |
| 2011/0250919 A1 | 10/2011 | Barbieri et al. |
| 2011/0275394 A1 | 11/2011 | Song et al. |
| 2011/0312319 A1 | 12/2011 | Lindoff et al. |
| 2011/0312358 A1 | 12/2011 | Barbieri et al. |
| 2011/0317624 A1 | 12/2011 | Luo et al. |
| 2012/0003945 A1 | 1/2012 | Liu et al. |
| 2012/0009959 A1 | 1/2012 | Yamada et al. |
| 2012/0044818 A1 | 2/2012 | Lindoff et al. |
| 2012/0063386 A1 | 3/2012 | Park et al. |
| 2012/0076025 A1 | 3/2012 | Barbieri et al. |
| 2012/0076040 A1 | 3/2012 | Hoshino et al. |
| 2012/0082197 A1 | 4/2012 | Jonsson et al. |
| 2012/0092989 A1 | 4/2012 | Baldemair et al. |
| 2012/0113851 A1 | 5/2012 | Schober et al. |
| 2012/0201152 A1 | 8/2012 | Yoo et al. |
| 2012/0263247 A1 | 10/2012 | Bhattad et al. |
| 2012/0327795 A1 | 12/2012 | Mallik et al. |
| 2012/0329498 A1 | 12/2012 | Koo et al. |
| 2013/0039203 A1 | 2/2013 | Fong et al. |
| 2013/0157675 A1 | 6/2013 | Li et al. |
| 2013/0301458 A1 | 11/2013 | Barbieri et al. |
| 2014/0348019 A1 | 11/2014 | Barbieri et al. |

FOREIGN PATENT DOCUMENTS

| | | |
|---|---|---|
| CN | 1943158 A | 4/2007 |
| EP | 1337054 A2 | 8/2003 |
| EP | 1735938 A1 | 12/2006 |
| JP | 2007189619 A | 7/2007 |
| JP | 3973017 B2 | 9/2007 |
| JP | 2010016494 A | 1/2010 |
| JP | 2013534778 A | 9/2013 |
| KR | 20080046404 A | 5/2008 |
| RU | 2211535 C2 | 8/2003 |
| RU | 2351069 C2 | 3/2009 |
| WO | 03041300 A1 | 5/2003 |
| WO | 2005089004 A1 | 9/2005 |
| WO | 2005099163 A1 | 10/2005 |
| WO | 2006020021 A1 | 2/2006 |
| WO | 2006099546 A1 | 9/2006 |
| WO | 2007016553 A1 | 2/2007 |
| WO | WO2008082118 A1 | 7/2008 |
| WO | 2008118810 A1 | 10/2008 |
| WO | 2009023730 | 2/2009 |
| WO | 2009057960 A2 | 5/2009 |
| WO | 2009065075 A1 | 5/2009 |
| WO | 2009099811 A1 | 8/2009 |
| WO | 2009119988 A1 | 10/2009 |
| WO | 2009120465 A2 | 10/2009 |
| WO | 2009120934 A1 | 10/2009 |
| WO | WO2009118707 A1 | 10/2009 |
| WO | WO2010002230 A2 | 1/2010 |
| WO | 2010025270 A1 | 3/2010 |
| WO | 2010056763 A2 | 5/2010 |
| WO | 2010058979 A2 | 5/2010 |
| WO | 2010083451 A2 | 7/2010 |
| WO | WO2010074444 A2 | 7/2010 |
| WO | WO2010089408 A1 | 8/2010 |
| WO | 2010103886 A1 | 9/2010 |

(56) References Cited

FOREIGN PATENT DOCUMENTS

| WO | WO2011002389 A1 | 1/2011 |
|---|---|---|
| WO | 2011130447 A1 | 10/2011 |
| WO | 2011163265 A1 | 12/2011 |
| WO | 2011163482 A1 | 12/2011 |
| WO | WO2012018894 A1 | 2/2012 |

OTHER PUBLICATIONS

CMCC: "Discussion on HeNB related interference scenarios and deployment configurations", 3GPP Draft; R4-091232, 3rd Generation Partnership Project (3GPP), Mobile Competence Centre ; 650, Route Des Lucioles ; F-06921 Sophia-Antipolis Cedex ; France, No. Seoul, Korea; 20090330, Mar. 30, 2009, XP050342009, [retrieved on Mar. 30, 2009] the whole document.
Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.
Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia-Antipolis Cedex ; France, No. Seoul, Korea; 20090328, Mar. 28, 2009, XP050339187, [retrieved on Mar. 28, 2009].
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; 20100222, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 6, 2010, XP050419318, [retrieved on Apr. 6, 2010].
International Search Report and Written Opinion—PCT/US2011/045334—ISA/EPO—Dec. 1, 2011.
NTT DOCOMO: "Interference Coordination for Non-CA-based Heterogeneous Networks", 3GPP Draft; R1-102307 ICIC for Non-CA HETNET, 3rd Generation Partnership Project (3GPP), Mobile Competence Centre ; 650, Route Des Lucioles ; F-06921 Sophia-Antipolis Cedex ; France, vol. RAN WGI, No. Beijing, china; 20100412, Apr. 7, 2010, XP050419698, [retrieved on Apr. 7, 2010].
Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010, pp. 26-34, XP011311805, ISSN: 1536-1284 p. 30, paragraph Uplink.
International Search Report and Written Opinion—PCT/US2011/053424—ISA/EPO—Feb. 29, 2012.

Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; 20080625, Jun. 25, 2008, XP050110793, [retrieved on Jun. 25, 2008].
Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.
"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010, pp. 1-80, XP050442094, [retrieved on Sep. 17, 2010].
Samsung: Static/Dynamic Home eNB ICIC function, 3GPP TSG RAN WG1 #61bis R1-103683, Jun. 24, 2010.
CATT: "Analysis of Time-Partitioning Solution for Control Channel", 3GPP TSG RAN WG1 meeting #61bis, R1-103494, Dresden, Germany, Jun. 28-Jul. 2, 2010, pp. 1-3.
Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.
Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.
Khandekar A., "LTE-Advanced: Heterogeneous networks", Wireless Conference (EW), 2010 European, Apr. 12-15, 2010, pp. 978-982.
LG Electronics, "Extending Rel-8/9 ICIC for heterogeneous network", 3GPP TSG RAN WG1 Meeting #60bis, R1-102430, Apr. 12-16, 2010, 4 pages.
Nishio A, et al., "Adaptive Transmission Techniques for Control Signaling in 3G-LTE," Panasonic Technical Journal, vol. 55, No. 1, Apr. 2009, pp. 15-20.
QUALCOMM Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre ; 650, Route Des Lucioles ; F-06921 Sophia-Anti Polis Cedex ; France, vol. RAN WG1, No. Dresden, Germany; 20100628, Jun. 28-Jul. 2, 2010 (Jun. 22, 2010), XP050449060, pp. 1-5.
QUALCOMM Incorporated, "Enabling communication in harsh interference scenarios", 3GPP TSG-RAN WG1 #62bis R1-105693 Oct. 11-15, 2010 Xian, China.
Research in Motion et al: "On Downlink Single Cell MU-MIMO in LTE-A", 3GPP Draft; R1-094458(RIM-downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; 20091109, Nov. 9, 2009, XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-22, 2010.

\* cited by examiner

PHYSICAL LAYER SIGNALING TO USER EQUIPMENT IN A WIRELESS COMMUNICATION SYSTEM

CROSS-REFERENCE TO RELATED APPLICATION

This application claims the benefit under 35 U.S.C. §119(e) to U.S. Provisional Patent Application No. 61/367,865 entitled "Physical Layer Signaling to User Equipment in a Wireless Communication System," filed on Jul. 26, 2010, the disclosure of which is expressly incorporated by reference herein in its entirety.

BACKGROUND

1. Field

Aspects of the present disclosure relate generally to wireless communication systems, and more particularly to signaling user equipment for estimating interference.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method of wireless communication is disclosed. The method includes receiving physical layer signaling from a serving eNodeB of the wireless network. The method also includes controlling interference estimation, interference cancellation, and/or spatial equalization of a user equipment (UE) in accordance with the physical layer signaling.

Another aspect discloses an apparatus including means for receiving physical layer signaling from a serving eNodeB of a wireless network. Also included is a means for controlling interference estimation, interference cancellation, and/or spatial equalization of a user equipment (UE) in accordance with the physical layer signaling.

In another aspect, a computer program product for wireless communications in a wireless network is disclosed. The computer readable medium has program code recorded thereon which, when executed by the processor(s), causes the processor(s) to perform operations of receiving physical layer signaling from a serving eNodeB of the wireless network. The program code also causes the processor(s) to control interference estimation, interference cancellation, and/or spatial equalization of a user equipment (UE) in accordance with the physical layer signaling.

Another aspect discloses a wireless communication device having a memory and at least one processor coupled to the memory. The processor(s) is configured to receive physical layer signaling from a serving eNodeB of the wireless network. The processor(s) is also configured to control interference estimation, interference cancellation, and/or spatial equalization of a user equipment (UE) in accordance with the physical layer signaling This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
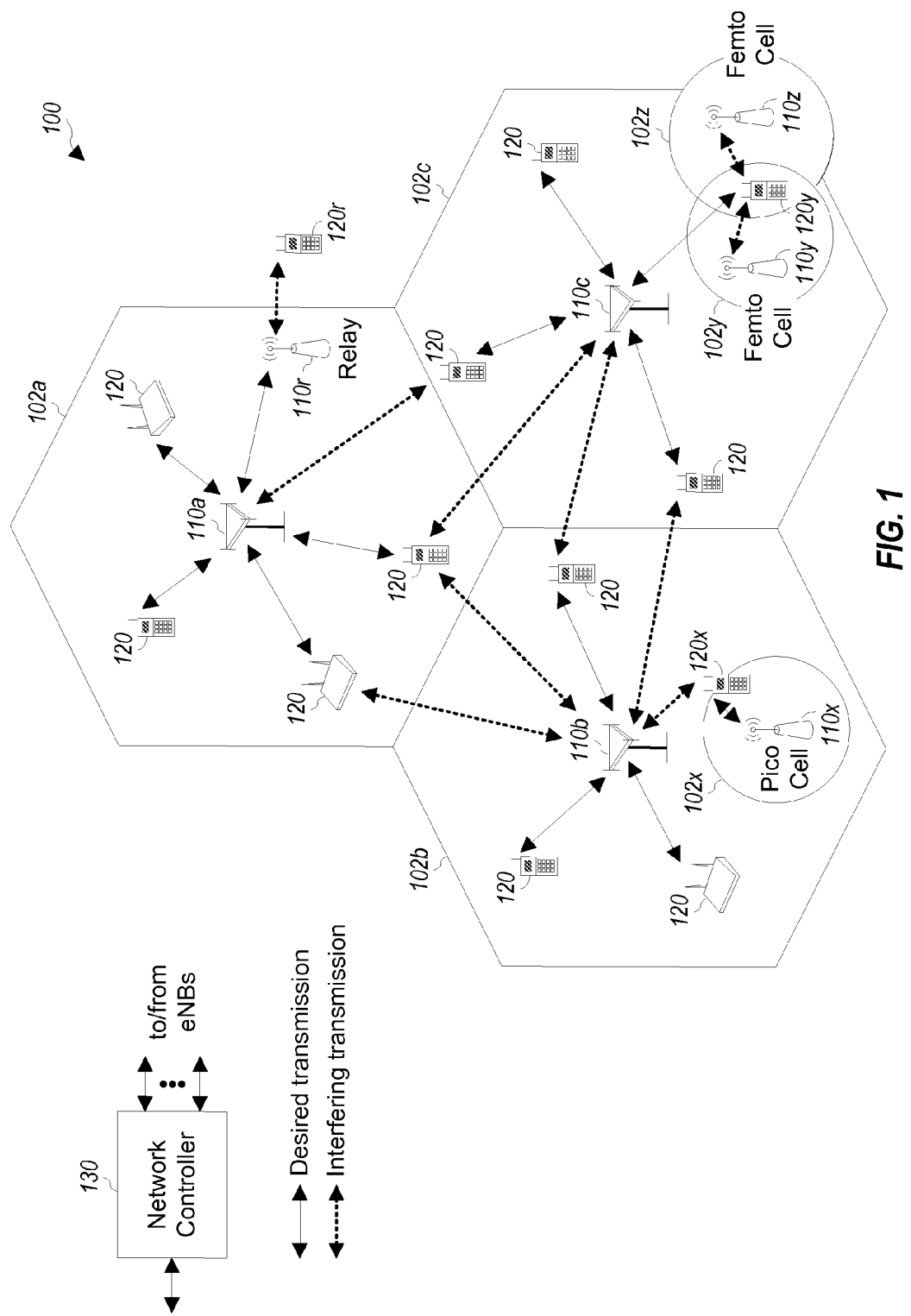
FIG. 1 is a block diagram conceptually illustrating an example of a telecommunications system.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time. Local synchronization of nearby eNodeBs will be considered a "synchronous network" for purposes of the present disclosure.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
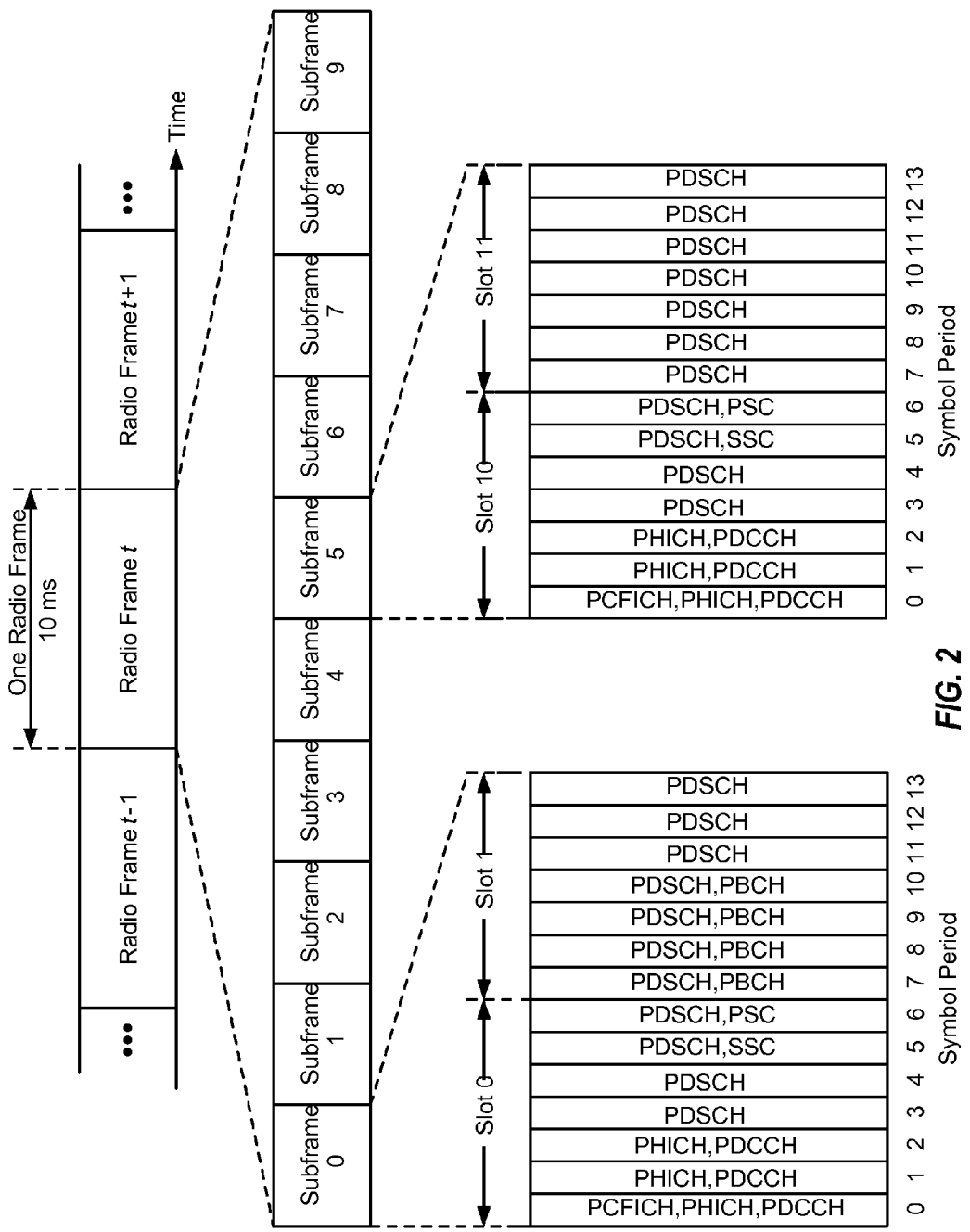
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
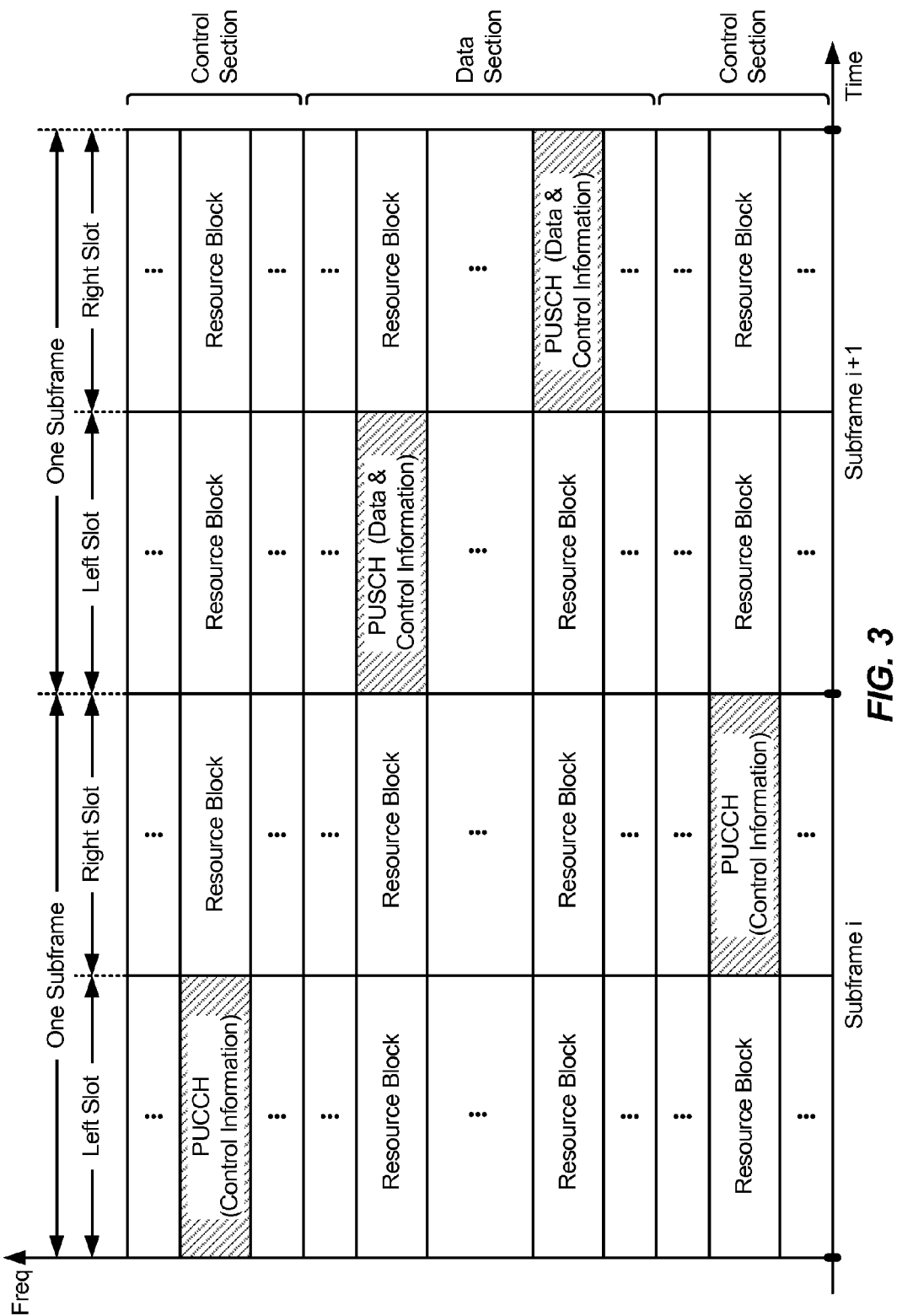
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
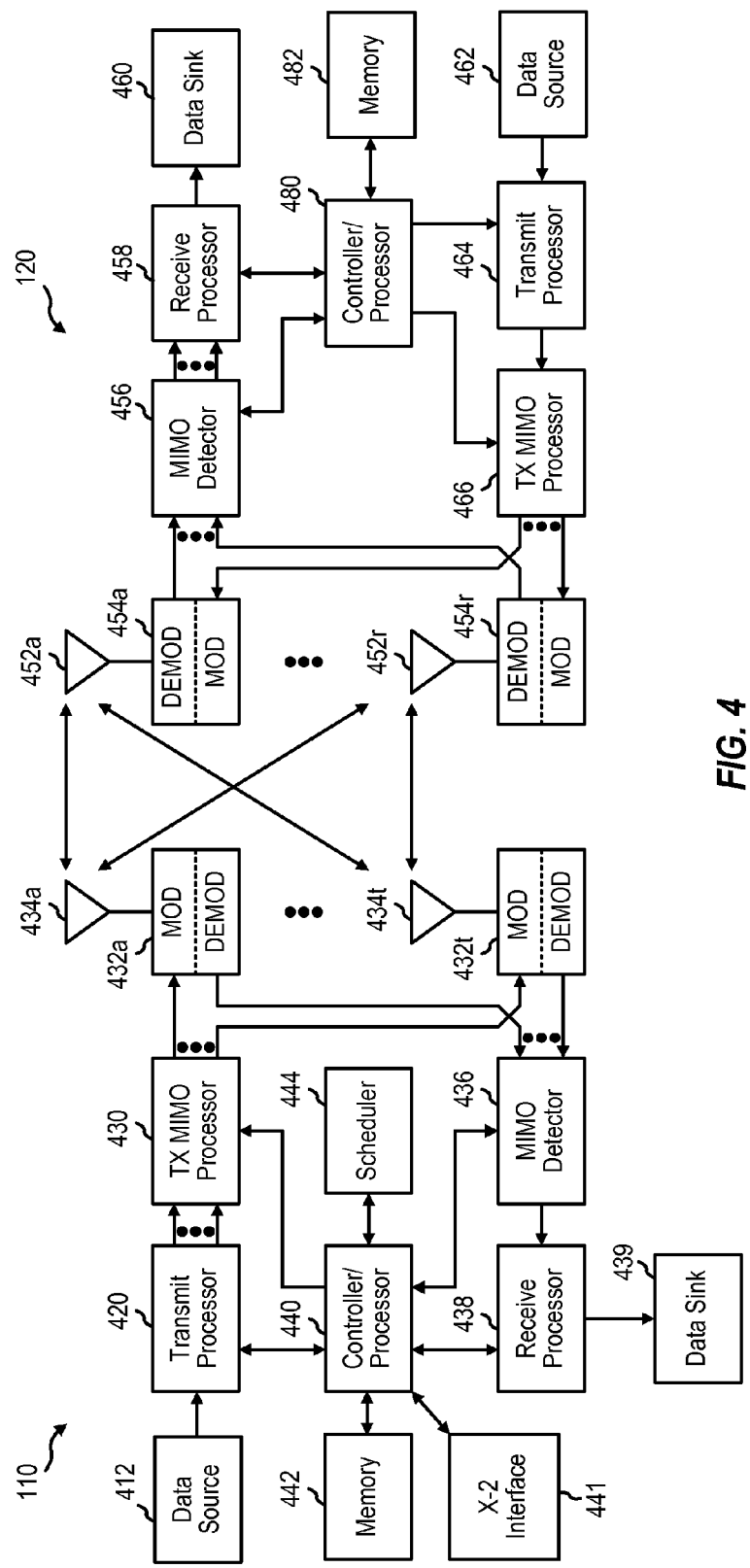
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs 110 and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 6, and/or other processes for the techniques described herein. The memories 442 and 482 may store data and program codes for the base station 110 and the UE 120, respectively. A scheduler 444 may schedule UEs for data transmission on the downlink and/or uplink.

Referring back to FIG. 1, the wireless network 100 uses the diverse set of eNodeBs 110 (i.e., macro eNodeBs, pico eNodeBs, femto eNodeBs, and relays) to improve the spectral efficiency of the system per unit area. Because the wireless network 100 uses such different eNodeBs for its spectral coverage, it may also be referred to as a heterogeneous network. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, which generally transmit at substantially lower power levels (e.g., 100 mW-2 W), may be deployed in a relatively unplanned manner to eliminate coverage holes in the coverage area provided by the macro eNodeBs 110a-c and improve capacity in the hot spots. The femto eNodeBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNodeB that may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. While such operational principals can lead to significantly sub-optimal performance, gains in network performance are realized in the wireless network 100 by using intelligent resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner. Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network 100 than in a macro eNodeB-only homogeneous network, where the downlink and uplink handover boundaries are more closely matched.

If server selection is based predominantly on downlink received signal strength, the usefulness of mixed eNodeB deployment of heterogeneous networks, such as the wireless network 100, may be greatly diminished. This is because the larger coverage area of the higher powered macro eNodeBs, such as the macro eNodeBs 110a-c, limits the benefits of splitting the cell coverage with the pico eNodeBs, such as the pico eNodeB 110x, because, the higher downlink received signal strength of the macro eNodeBs 110a-c will attract all of the available UEs, while the pico eNodeB 110x may not be serving any UE because of its much weaker downlink transmission power. Moreover, the macro eNodeBs 110a-c will likely not have sufficient resources to efficiently serve those UEs. Therefore, the wireless network 100 will attempt to actively balance the load between the macro eNodeBs 110a-c and the pico eNodeB 110x by expanding the coverage area of the pico eNodeB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNodeB that offers the minimum path loss to the UE. Additionally, the wireless network 100 provides a fixed partitioning of resources equally between the macro eNodeBs 110a-c and the pico eNodeB 110x. However, even with this active balancing of load, downlink interference from the macro eNodeBs 110a-c should be mitigated for the UEs served by the pico eNodeBs, such as the pico eNodeB 110x. This can be accomplished by various methods, including interference cancellation at the UE, resource coordination among the eNodeBs 110, or the like.

In a heterogeneous network with range extension, such as the wireless network 100, in order for UEs to obtain service from the lower-powered eNodeBs, such as the pico eNodeB 110x, in the presence of the stronger downlink signals transmitted from the higher-powered eNodeBs, such as the macro eNodeBs 110a-c, the pico eNodeB 110x engages in control channel and data channel interference coordination with the dominant interfering ones of the macro eNodeBs 110a-c. Many different techniques for interference coordination may be employed to manage interference. For example, inter-cell interference coordination (ICIC) may be used to reduce interference from cells in co-channel deployment. One ICIC mechanism is time division multiplexing (TDM) partitioning. TDM partitioning assigns subframes to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNodeBs of different power classes. For example, three power classes may be defined, in decreasing power class, as macro eNodeBs, pico eNodeBs, and femto eNodeBs. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

Figure 5:
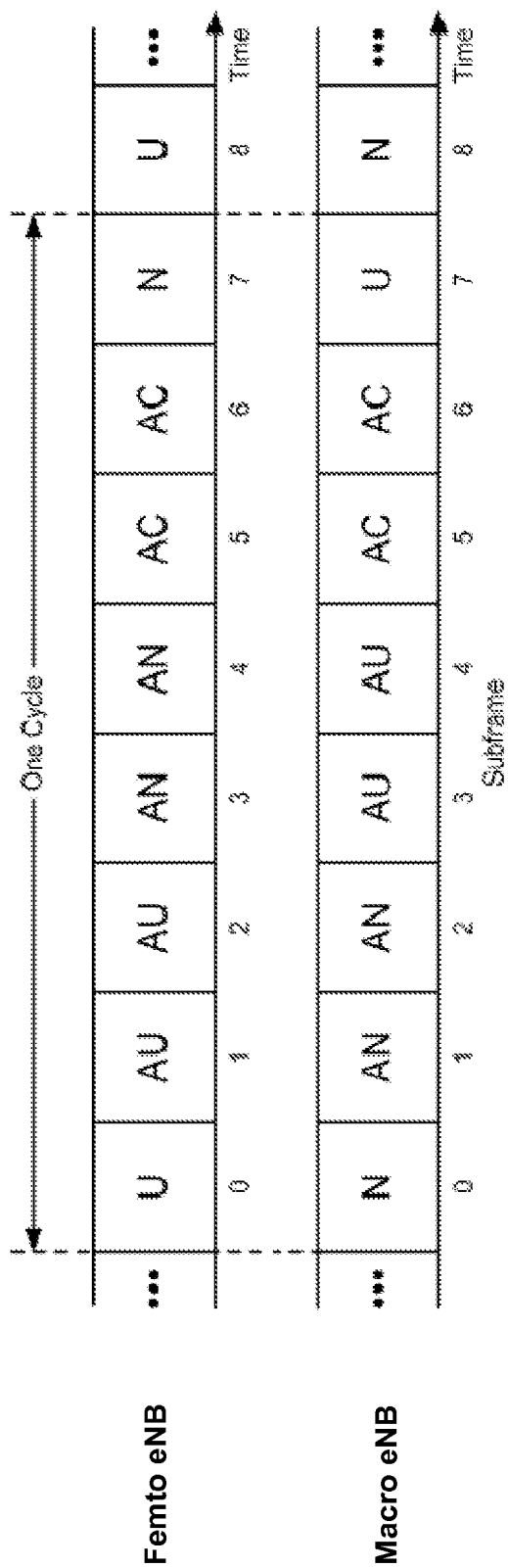
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 µs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

The subframe types "U", "N", "X", which are also referred to as SRPI (semi-static resource partitioning information), may be semi-static over time and therefore may be conveyed to UEs via higher layer signaling, (e.g. in a SIB (system information block). The sub-types "AU", "AN", "AC", which are also referred to as ARPI (adaptive resource partitioning information), are dynamically negotiated among participating eNodeBs. The ARPI sub-types are difficult to convey to UEs via higher layer signaling, because higher layer signaling incurs large overhead and delay. This large overhead and delay makes higher level signaling inappropriate for signaling dynamic time-varying information. For at least this reason, up until now the ARPI has been unknown to UEs.

The ARPI sub-types, i.e., the "X" subframes, give ambiguity to how a UE should proceed with interference estimation. For example, if the time/frequency positions of CRS (common reference signal) tones of a neighboring cell on its "X" subframe collide with the common reference signal positions of the serving cell, and if the UE uses the common reference signal for interference estimation, then the UE's interference estimation may only be suitable for AN subframes in certain instances, and may be suitable for AU/AC subframes in other instances.

In this example, if the UE does not employ CRS IC (common reference signal interference cancellation), the UE's interference estimation will reflect control/data transmission from the neighbor and is therefore suitable for AU/AC subframes. If the UE employs common reference signal interference cancellation, the UE's interference estimation will reflect no control/data transmission from the neighbor and is therefore only suitable for AN subframes. If the UE employs common reference signal interference cancellation, and if the UE explicitly adds the covariance estimate of the received signal from the neighboring cell into the UE's interference estimation (termed "Nt add-back"), the UE's interference estimation will reflect control/data transmission from the neighbor, and is therefore suitable for AU/AC subframes.

However, in all of the above scenarios, mismatches may occur as the UE does not know whether the given X subframe is either AU/AC or AN. In many cases, the mismatch severely impacts decoding performance and CQI (channel quality indicator) reporting accuracy. In one aspect of the present disclosure, the eNodeB may signal the loading status of neighbor cells to UEs and the receiving UE can utilize the information to improve receiver functionality.

In one example, the eNodeB may signal one bit to each neighboring cell for the UE. In particular, the eNodeB may transmit a bit status detailing whether the neighboring cell is transmitting or not transmitting. In other words, the eNodeB may transmit a signal regarding whether the "X" subframe is being used as "AN" or "AU/AC" by the given neighboring cell. In another aspect, the eNodeB may send multiple bits for each neighboring cell, where each bit represents a particular subband.

A UE capable of common reference signal interference cancellation may use this information to determine whether the UE may include the received signal from the given neighboring cell into the UE's interference estimation. With respect to adaptive resource partitioning information, if the neighboring cell subframe type is an AU/AC, and if the UE's original interference estimation failed to capture the interference from the neighboring cell due to various reasons (e.g., CRS interference cancellation), then the UE can correct its interference estimation by explicitly adding the covariance estimate of the received signal from the neighboring cell into the UE's interference estimation, i.e., by employing "Nt add-back".

Interference estimation may be used for various purposes, such as demodulation/decoding of control and data channels, and for CQI (channel quality indicator) computation. In the illustrative examples described herein, the UE may determine whether to employ Nt add-back independently for each purpose.

In some aspects disclosed herein, signaling by the eNodeB to the UE may be performed on the physical layer on a subframe by subframe basis. In other words, a new signal may be provided to the UE for each subframe. Physical layer signaling provides fast transfer of information which may be advantageous for the described signals when the information changes rapidly. The signal may be communicated using one or more additional bits inside a physical downlink control channel (PDCCH). Alternately, the in optional aspects, a signal may be communicated using one or more additional bits inside a physical broadcast channel (PBCH). The additional bits may include information identifying the type of "X" frames used by one or more neighboring cells. In one configuration, a full bit mask, including one bit for each subframe per interfering neighboring cell may be used to indicate, for each neighboring cell, subframes that belong to AU/AC subframes where Nt add-back or other functionality will be enabled. In another configuration, one bit for each interfering neighboring cell may be used in PDCCH on each subframe to indicate neighboring cells for which Nt add-back or other functionality will be enabled for the subframe. In yet another configuration, a single bit may be used in PDCCH on each subframe to indicate to the UE whether to perform Nt add-back or other functionality for all the neighboring cells the UE observes on the subframe.

In another aspect, the physical layer signaling may be semi-static triggering. For example, start times and/or end times can be triggered to enable or disable receiver functionality. In one configuration, the semi-static triggering is implemented with a semi-persistent scheduling (SPS) type of PDCCH triggering mechanism. This may be achieved, for example, by either introducing a new PDCCH DCI (downlink control information) format or using a special bit pattern in the existing PDCCH DCI format. In this configuration, for example, the signal may include bit patterns corresponding to ARPI of neighboring cells. In another configuration, the signal may include indices to one or more a pre-assigned ARPI bit patterns of neighboring cells. In one aspect, format 1A of the PDCCH is used for the semi-static triggering.

Examples of receiver functionality, such as interference estimation, that may be informed and/or controlled by signaling according to the aspects described include, but are not limited to, types of spatial equalization processing such as whether the UE may use MMSE (minimum mean squared error), MRC (maximum ratio combining), and/or IRC (interference rejection combining); whether or not the UE may enable interference cancellation, and whether or not the UE may consider a given neighboring cell as an interferer. The interference cancellation may be separately indicated for CRS, for control channels, and/or for PDSCH. Spatial equalization of UEs may be controlled by signaling to the UE whether or not co-channel users are present in MU MIMO (multi-user multiple input multiple output) systems.

Figure 6:
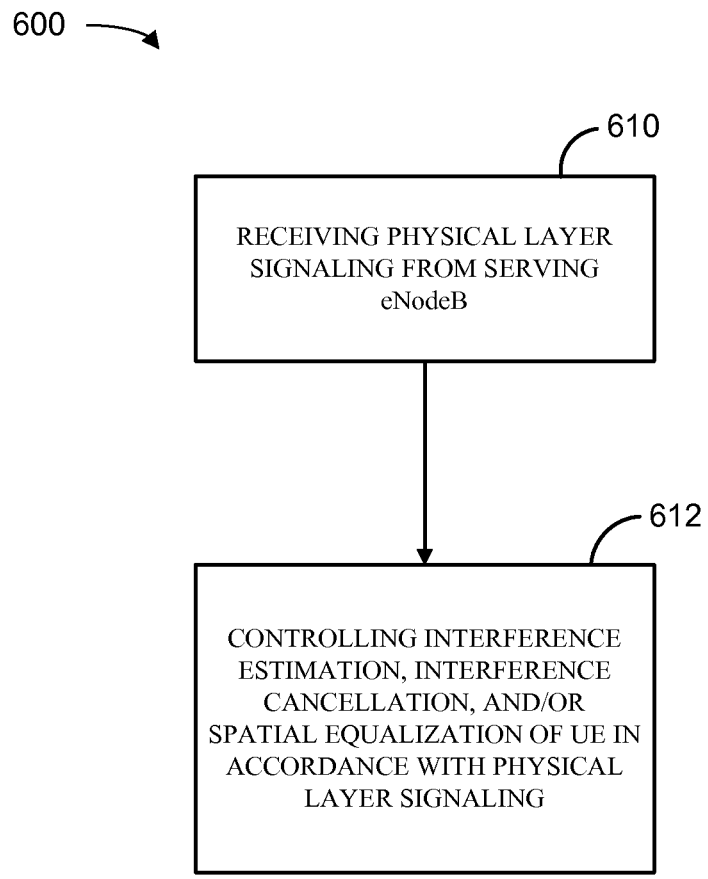
FIG. 6 is a block diagram illustrating a method for physical layer signaling according to one aspect of the present disclosure.

FIG. 6 illustrates a method 600 for triggering certain receiver functionality. In block 610 a UE receives physical layer signaling from an eNodeB, where the eNodeB may signal the loading status of neighboring cells to UEs. In block 612, the UE controls interference estimation, interference cancellation, and/or its spatial equalization in accordance with the received physical layer signaling.

In one configuration, the UE 120 is configured for wireless communication including means for receiving. In one aspect, the receiving means may be the antenna 452a-r, the demodulators 454a-r, the MIMO detector 456, the receive processor 458, the controller/processor 480 and/or the memory 482 configured to perform the functions recited by the receiving means. The UE 120 is also configured to include a means for controlling. In one aspect, the controlling means may be the controller/processor 480 and/or memory 482 configured to perform the functions recited by the controlling means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network, comprising:
    receiving physical layer signaling from a serving eNodeB of the wireless network, the signaling indicating adaptive resource partitioning information (ARPI) for subframe types of at least one neighboring eNodeB, the subframe types comprising protected subframes, prohibited subframes, and common subframes that are dynamically negotiated between the serving eNodeB and the at least one neighboring eNodeB, and the ARPI indicating whether the at least one neighboring eNodeB is permitted to transmit based at least in part on a subframe type of a particular subframe; and
    controlling at least interference estimation, interference cancellation, spatial equalization, or a combination thereof of a user equipment (UE) in accordance with the physical layer signaling.

2. The method of claim 1, in which the physical layer signaling indicates whether a neighboring eNodeB is in a transmitting state or in a non-transmitting state.

3. The method of claim 2, further comprising correcting the interference estimation by adding a covariance estimate of a received signal from the at least one neighboring eNodeB into the interference estimation when the physical layer signaling indicates:
    the at least one neighboring eNodeB is allowed to transmit; and
    the interference estimation did not recognize interference from the at least one neighboring eNodeB.

4. The method of claim 2, in which the physical layer signaling indicates a change of an ARPI pattern of the at least one neighboring eNodeB.

5. The method of claim 1, in which the physical layer signaling is for each neighboring eNodeB or a group of neighboring eNodeBs.

6. The method of claim 1, in which the physical layer signaling indicates at least a subband, a subframe, a particular time period, or a combination thereof.

7. The method of claim 1, in which controlling spatial equalization comprises controlling whether the UE uses MMSE (minimum mean squared error) processing, or MRC (maximum ratio combining)/IRC (interference rejection combining) processing.

8. An apparatus for wireless communication in a wireless network, comprising:
    means for receiving physical layer signaling from a serving eNodeB of the wireless network, the signaling indicating adaptive resource partitioning information (ARPI) for subframe types of at least one neighboring eNodeB, the subframe types comprising protected subframes, prohibited subframes, and common subframes that are dynamically negotiated between the serving eNodeB and the at least one neighboring eNodeB, and the ARPI indicating whether the at least one neighboring eNodeB is permitted to transmit based at least in part on a subframe type of a particular subframe; and
    means for controlling at least interference estimation, interference cancellation, spatial equalization, or a combination thereof of a user equipment (UE) in accordance with the physical layer signaling.

9. A a non-transitory computer-readable medium having non-transitory program code recorded thereon for wireless communication in a wireless network, the program code comprising:
    program code to receive physical layer signaling from a serving eNodeB of the wireless network, the signaling indicating adaptive resource partitioning information (ARPI) for subframe types of at least one neighboring eNodeB, the subframe types comprising protected subframes, prohibited subframes, and common subframes that are dynamically negotiated between the serving eNodeB and the at least one neighboring eNodeB, and the ARPI indicating whether the at least one neighboring eNodeB is permitted to transmit based at least in part on a subframe type of a particular subframe; and
    program code to control at least interference estimation, interference cancellation, spatial equalization, or a combination thereof of a user equipment (UE) in accordance with the physical layer signaling.

10. An apparatus for wireless communication in a wireless network, comprising:
    a memory; and
    at least one processor coupled to the memory, the at least one processor being configured:
        to receive physical layer signaling from a serving eNodeB of the wireless network, the signaling indicating adaptive resource partitioning information (ARPI) for subframe types of at least one neighboring eNodeB, the subframe types comprising protected subframes, prohibited subframes, and common subframes that are dynamically negotiated between the serving eNodeB and the at least one neighboring eNodeB, and the ARPI indicating whether the at least one neighboring eNodeB is permitted to transmit based at least in part on a subframe type of a particular subframe; and to control at least interference estimation, interference cancellation, spatial equalization, or a combination thereof of a user equipment (UE) in accordance with the physical layer signaling.

11. The apparatus of claim 10, in which the physical layer signaling indicates whether a neighboring eNodeB is in a transmitting state or in a non-transmitting state.

12. The apparatus of claim 11, in which the processor is further configured to correct the interference estimation by adding a covariance estimate of a received signal from the at least one neighboring eNodeB into the interference estimation when the physical layer signaling indicates:

the at least one neighboring eNodeB is allowed to transmit; and the interference estimation did not recognize interference from the at least one neighboring eNodeB.

13. The apparatus of claim 11, in which the physical layer signaling indicates a change of an ARPI pattern of the at least one neighboring eNodeB.

14. The apparatus of claim 10, in which the physical layer signaling is for each neighboring eNodeB or a group of neighboring eNodeBs.

15. The apparatus of claim 10, in which the physical layer signaling indicates at least a subband, a subframe, a particular time period, or a combination thereof.

16. The apparatus of claim 10, in which the processor configured to control spatial equalization is further configured to control whether the UE uses MMSE (minimum mean squared error) processing, or MRC (maximum ratio combining)/IRC (interference rejection combining) processing.

\* \* \* \* \*